US012810542B2

(12) United States Patent
Kim et al.

(10) Patent No.: US 12,810,542 B2
(45) Date of Patent: Nov. 24, 2026

(54) 3D CALIBRATION METHOD AND APPARATUS FOR MULTI-VIEW PHASE SHIFT PROFILOMETRY

(71) Applicants: Korea Advanced Institute of Science and Technology, Daejeon (KR); MIRTEC Co., Ltd., Gunpo-si (KR)

(72) Inventors: Min Hyuk Kim, Daejeon (KR); Hyeongjun Cho, Daejeon (KR)

(73) Assignee: KOREA ADVANCED INSTITUTE OF SCIENCE AND TECHNOLOGY, Yuseong-gu (KR)

( * ) Notice: Subject to any disclaimer, the term of this patent is extended or adjusted under 35 U.S.C. 154(b) by 314 days.

(21) Appl. No.: 18/509,771

(22) Filed: Nov. 15, 2023

(65) Prior Publication Data

US 2025/0148706 A1 May 8, 2025

(30) Foreign Application Priority Data

Nov. 15, 2022 (KR) ........................ 10-2022-0152975

(51) Int. Cl.
*G06T 17/00* (2006.01)
*G06T 7/80* (2017.01)

(52) U.S. Cl.
CPC ................ *G06T 17/00* (2013.01); *G06T 7/80* (2017.01)

(58) Field of Classification Search
CPC ............................................ G06T 2207/10028
See application file for complete search history.

(56) References Cited

U.S. PATENT DOCUMENTS

| | | | | |
|---|---|---|---|---|
| 9,386,236 B2 * | 7/2016 | Muller | G02B 21/0032 | |
| 11,748,940 B1 * | 9/2023 | Xian | G06T 15/205 | 345/419 |
| 2010/0303341 A1 * | 12/2010 | Hausler | A61B 5/1079 | 382/154 |
| 2011/0080471 A1 * | 4/2011 | Song | G06T 7/521 | 356/627 |
| 2012/0092463 A1 * | 4/2012 | Liu | G01B 11/2536 | 348/E13.074 |
| 2013/0188012 A1 * | 7/2013 | Bellis | H04N 23/51 | 348/42 |

(Continued)

OTHER PUBLICATIONS

Ikehata et al., Confidence-based Refinement of Corrupted Depth Maps, 2012 (Year: 2012).*

(Continued)

*Primary Examiner* — Phong X Nguyen
(74) *Attorney, Agent, or Firm* — McCormick, Paulding & Huber PLLC

(57) ABSTRACT

Disclosed is a three-dimensional (3D) calibration method and device for multi-view phase shift profilometry. A 3D calibration method for multi-view phase shift profilometry, performed by a computer device, according to an example embodiment may include acquiring a phase that is data required for 3D reconstruction from parameters of at least one camera and a projector based on a phase measuring profilometry (PMP) method; defining a phase-to-depth function for each camera-and-projector combination and performing calibration of optimizing the parameters of the camera and the projector; and acquiring a point cloud that includes depth information using the optimized parameters of the camera and the projector.

6 Claims, 19 Drawing Sheets

(56) References Cited

U.S. PATENT DOCUMENTS

| | | | | |
|---|---|---|---|---|
| 2015/0022644 | A1* | 1/2015 | Appia | G01B 11/2536 348/49 |
| 2016/0078610 | A1* | 3/2016 | Rudd | G06T 7/521 348/87 |
| 2016/0335773 | A1* | 11/2016 | Romano | G06T 7/521 |
| 2017/0154436 | A1* | 6/2017 | Zhang | H04N 13/239 |
| 2019/0101382 | A1* | 4/2019 | Taubin | G01B 11/254 |
| 2019/0108396 | A1* | 4/2019 | Dal Mutto | G06F 18/24 |
| 2020/0382760 | A1* | 12/2020 | Zhang | G01B 11/25 |
| 2022/0414913 | A1* | 12/2022 | Baek | G06T 7/593 |
| 2024/0119613 | A1* | 4/2024 | Lu | G01B 11/254 |
| 2025/0148706 | A1* | 5/2025 | Kim | G06T 7/80 |

OTHER PUBLICATIONS

Huang et al., Phase-to-depth calibration in fringe projection profilometry based on blockwise surface fitting, 2020 (Year: 2020).*

* cited by examiner $\psi$

3D CALIBRATION METHOD AND APPARATUS FOR MULTI-VIEW PHASE SHIFT PROFILOMETRY

BACKGROUND

1. Field of the Invention

The following example embodiments relate to a three-dimensional (3D) calibration method and apparatus for multi-view phase shift profilometry, and more particularly, to a 3D calibration method and apparatus for multi-view phase shift profilometry that may improve quality of a 3D reconstruction task in a multi-view system.

2. Description of the Related Art

Acquiring geometric data of objects present in a three-dimensional (3D) space, that is, 3D scanning refers to technology with a great value. In particular, 3D scanning may be technology with infinite utility, such as equipment to acquire and inspect information on a 3D shape of an object, such as a semiconductor.

Representative 3D scanning technology includes a phase measuring profilometry (PMP) method, which is a method of acquiring 3D information of an object by projecting a predefined structured light image through a projector and capturing the same through a camera using the camera and the projector. However, when performing 3D scanning of an object with this method, there are restrictions that the camera needs to be able to view a point to be acquired and light emitted from the projector needs to reach the point. For example, when it is assumed that the camera is present in a downward direction from the top of a system, side data of an object that may be acquired as a result of 3D scanning may be very insufficient. Therefore, to perform 3D scanning of the object in all directions, the projector needs to emit light from as many different directions as possible and it is necessary to perform capturing from cameras present at various positions.

In addition, to acquire high-quality results, it is necessary to combine 3D data, to discard unnecessary points, and to process data based on more reliable points, rather than simply acquiring the 3D data with a combination of a single camera-and-projector pair.

SUMMARY

Example embodiments describe a three-dimensional (3D) calibration method and apparatus for multi-view phase shift profilometry, and more particularly, provide technology for optimizing various parameters including position information of a projector and a camera in a system with a plurality of top and side cameras.

Example embodiments provide a 3D calibration method and apparatus for multi-view phase shift profilometry that may perform calibration of a phase measuring profilometry (PMP) system for 3D reconstruction with only one target by performing shooting for a calibration target and then adding a depth map of a side camera to a depth map of a main camera and by acquiring a final 3D point cloud in which a depth map fusion is performed and may perform calibration and 3D reconstruction with only one scene without performing additional shooting while moving a corresponding target.

According to an example embodiment, there is provided a 3D calibration method for multi-view phase shift profilometry, performed by a computer device, the 3D calibration method including acquiring a phase that is data required for 3D reconstruction from parameters of at least one camera and a projector based on a phase measuring profilometry (PMP) method; defining a phase-to-depth function for each camera-and-projector combination and performing calibration of optimizing the parameters of the camera and the projector; and acquiring a point cloud that includes depth information using the optimized parameters of the camera and the projector.

The acquiring of the phase may include projecting a series of structured light images using the projector; detecting projected light that is reflected from an object using a sensor of the at least one camera; and acquiring the phase required for the 3D reconstruction using a single camera-and-projector pair.

The acquiring of the phase may include configuring a main camera located at the top and a side camera located on at least one side surface, and acquiring the phase based on the PMP method using the projector located between the main camera and the side camera.

The 3D calibration method may further include performing transformation from world coordinates to camera coordinates for all points in the point cloud, storing a z value of the camera coordinates, and acquiring a depth map for each camera-and-projector pair; and computing pixel-wise confidences of all the depth maps and performing the 3D reconstruction by acquiring a final point cloud through a confidence-based depth map fusion that integrates the respective depth maps into a single depth map based on the confidences.

The performing of the 3D reconstruction by acquiring the final point cloud may include performing a depth map fusion through a weighted sum with a depth map of the main camera along with a corresponding confidence for points visible to the main camera, with respect to points in a 3D space acquirable through a depth of each pixel when computing the pixel-wise confidences of the depth maps; and performing the depth map fusion through a weighted sum in a depth map of a remaining side camera for points not visible to the main camera.

According to another example embodiment, there is provided a 3D calibration apparatus for multi-view phase shift profilometry, the 3D calibration apparatus including a phase acquisition unit configured to acquire a phase that is data required for 3D reconstruction from parameters of at least one camera and a projector based on a PMP method; a calibration unit configured to define a phase-to-depth function for each camera-and-projector combination and to perform calibration of optimizing the parameters of the camera and the projector; and a point cloud acquisition unit configured to acquire a point cloud that includes depth information using optimized parameters of the camera and the projector.

The phase acquisition unit may be configured to acquire the phase required for the 3D reconstruction using a single camera-and-projector pair in such a manner that the projector projects a series of structured light images and projected light is reflected from an object and detected at a sensor of the at least one camera.

The phase acquisition unit may be configured to configure a main camera located at the top and a side camera located on at least one side surface, and to acquire the phase based on the PMP method using the projector located between the main camera and the side camera.

The 3D calibration apparatus may further include a depth map acquisition unit configured to perform transformation from world coordinates to camera coordinates for all points in the point cloud, to store a z value of the camera coordinates, and to acquire a depth map for each camera-and-projector pair; and a depth map fusion unit configured to compute pixel-wise confidences of all the depth maps and to perform the 3D reconstruction by acquiring a final point cloud through a confidence-based depth map fusion that integrates the respective depth maps into a single depth map based on the confidences.

The depth map fusion unit may be configured to perform a depth map fusion through a weighted sum with a depth map of the main camera along with a corresponding confidence for points visible to the main camera, with respect to points in a 3D space acquirable through a depth of each pixel when computing the pixel-wise confidences of the depth maps, and to perform the depth map fusion through a weighted sum in a depth map of a remaining side camera for points not visible to the main camera.

According to example embodiments, it is possible to provide a 3D calibration method and apparatus for multi-view phase shift profilometry that may optimize various parameters including position information of a projector and a camera and may improve quality of a 3D reconstruction task in a system with a plurality of top and side cameras.

Also, according to some example embodiments, it is possible to provide a 3D calibration method and apparatus for multi-view phase shift profilometry that may perform calibration of a PMP system for 3D reconstruction with only one target by performing shooting for a calibration target and then adding a depth map of a side camera to a depth map of a main camera and by acquiring a final 3D point cloud in which a depth map fusion is performed and may perform calibration and 3D reconstruction with only one scene without performing additional shooting while moving a corresponding target.

DETAILED DESCRIPTION TO CARRY OUT THE INVENTION

Figure 1A:
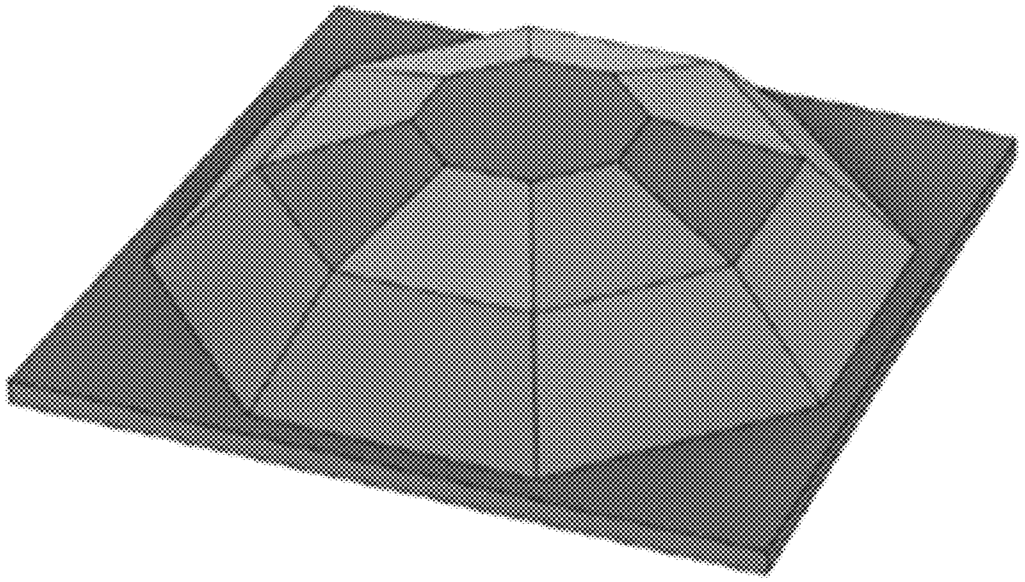
FIGS. 1A and 1B illustrate a three-dimensional (3D) model of a calibration target and a two-dimensional (2D) view including Aruco markers according to an example embodiment.

Hereinafter, example embodiments will be described with reference to the accompanying drawings. However, the example embodiments may be modified in various other forms and the scope of the present invention is not limited to the example embodiments described below. Also, various example embodiments are provided to more fully explain the present invention to one of ordinary skill in the art. Shapes and sizes of elements in the drawings may be exaggerated for clear explanation.

The example embodiments aim to perform three-dimensional (3D) reconstruction of an object using a main camera located at the top of a system, a side camera located at the side of the system, and a projector located therebetween. To this end, 3D data of the object is to be acquired using a commonly available phase measuring profilometry (PMP) method.

First, in the PMP method, a projector projects a series of structured light images and projected light is reflected from an object and sensed by a sensor of a camera. In this case, data required for 3D reconstruction, that is, a phase may be acquired using a single camera-and-projector pair. A process of generating the structured light image is called encoding, and a process of transforming an image captured from the camera to a phase map is called decoding. Here, a final goal of the PMP method is to define and optimize a phase-to-depth function for each camera.

The phase-to-depth function is to transform phase to depth and may be expressed in various types of models. In the example embodiment, a stereo model is adopted. A stereo triangulation model models the projector with a single pinhole camera and acquires 3D data in the same manner as the existing stereo matching. In the stereo triangulation model, the phase-to-depth function may be expressed as a function of an intrinsic parameter and an extrinsic parameter of the camera and the projector. Therefore, a main goal of the example embodiment may be to establish a calibration process of optimizing parameters of the camera and the projector.

The phase-to-depth function may be defined for every camera-and-projector combination at the same time of performing calibration of the camera and the projector.

However, through the above process, each camera-and-projector combination may be acquired and 3D data may be acquired in a form of an independent point cloud or depth map. Here, an error may occur therebetween. Therefore, 3D reconstruction is finally completed through a confidence-based depth map fusion that integrates the respective depth maps into a single depth map. In this confidence-based depth map fusion process, a confidence is computed for each pixel of each depth map. Here, points in a 3D space that may be acquired through depth of each pixel may be divided into two cases: a case in which a point is visible to a main camera located at the top and a case in which a point is not visible.

For points visible to the main camera, a depth map fusion is performed through a weighted sum with a depth map of the main camera along with a corresponding confidence. For points not visible to the main camera, the depth map fusion is performed through a weighted sum in a depth map of a remaining side camera.

Hereinafter, a 3D calibration method and device for multi-view phase shift profilometry according to an example embodiment will be described in more detail.

Table 1 shows a notation.

TABLE 1

| Notation | Description |
|---|---|
| [x y z], [x y] | 3D or 2D coordinates having x, y, and z axis or x and y axis coordinate values |
| [u v] | Pixel coordinates having horizontal axis and vertical axis coordinate values |
| $X_w = [x_w\ y_w\ z_w]$ | World coordinates of 3D point |
| $X_c = [x_c\ y_c\ z_c]$ | Camera coordinates of 3D point |
| R, t | Rotation and translation of camera, projector, and target plane |
| p = [u v] | Camera pixel coordinates |
| $x_n$ | Point on normalized plane of camera and projector |
| $\phi_f$ | Wrapped phase in image of frequency f |
| $\psi_x$, $\psi_y$ | Unwrapped phase in direction of horizontal axis and vertical axis |
| n, c | Normal and plane equation constant of plane |
| d(u, v) | depth at (u, v) pixel of depth map |
| C(u, v) | Confidence at (u, v) pixel of depth map |
| D(u, v) | Depth at (u, v) pixel after depth map fusion |

Camera Parameter

Camera parameters may be divided into an extrinsic parameter, such as R and t, and an intrinsic parameter including K and lens distortion coefficients ($k_1$, $k_2$, $k_3$). The extrinsic parameter refers to a parameter for a relationship between a world coordinate system and a camera coordinate system. The following relationship is established between a world coordinate $X_w$ of a point present in a 3D space and a camera coordinate $X_c$.

$$X_c = [\,x_c \quad y_c \quad z_c\,]' = RX_w + t' \qquad \text{[Equation 1]}$$

Here, R and t are 3×3 and 3×1 matrices, respectively, each expressing a rigid-body transform in the 3D space and may be expressed as follows.

$$T = \begin{bmatrix} R & t \\ 0 & 1 \end{bmatrix} = \overline{\exp}(q),\ q \in \sim^6,\ T \in \sim^{4\times 4}, \qquad \text{[Equation 2]}$$

$$\exp\colon se(3) \mapsto SE(3) \longrightarrow \overline{\exp}\colon \sim^6 \mapsto \sim^{4\times 4}$$

$$q = [\,t_x \quad t_y \quad t_z \quad q_0 \quad q_1 \quad q_2\,]$$

In [Equation 2], vector q includes a total of six elements, three translations and three quaternions.

In a pinhole camera model, $p_c$ is projected onto the normalized image plane, that is, the plane of z=1 in the camera coordinate system.

$$\hat{x}_n = [\,x_n \quad y_n \quad 1\,]' = [\,x_c/z_c \quad y_c/z_c \quad 1\,]' \qquad \text{[Equation 3]}$$

In [Equation 3], $\hat{x}_c$ denotes a homogeneous coordinate of $x_c$. Meanwhile, a camera using a telecentric lens, such as the main camera at the top of the system, is projected in a slightly different manner.

$$\hat{x}_n = [\,x_n \quad y_n \quad 1\,]' = [\,x_c \quad y_c \quad 1\,]' \qquad \text{[Equation 4]}$$

An intrinsic parameter of the camera specifies a relationship between $x_n'$ and a pixel coordinate p. First, radial distortion correction by a camera lens is performed at normalized image coordinates.

$$x_n = x_n'\left(1 + k_1 r_n^2 + k_2 r_n^4 + k_3 r_n^6\right) \qquad \text{[Equation 5]}$$

$$y_n = y_n'\left(1 + k_1 r_n^2 + k_2 r_n^4 + k_3 r_n^6\right)$$

$$r_n^2 = x_n'^2 + y_n'^2$$

$x'_c$ and $y'_c$ denote distorted normalized coordinates distorted in the x axis and the y axis, respectively. Then, the camera matrix K denotes a relationship between a distorted normalized camera coordinate $x'_n$ and the pixel coordinate p.

$$p = K\hat{x}_n' \qquad \text{[Equation 6]}$$

Through the above process, the pixel coordinate or vice versa may be computed from an arbitrary 3D point $X_w$.

Calibration Target Configuration

When it is assumed that there is no distortion by the camera lens, a relationship between the 3D point $X_w$ and the corresponding pixel p in the pinhole camera model is expressed as follows.

$$s \cdot \hat{p} = K[R|t]\hat{p}_w = K[R|t]\begin{bmatrix} x_w \\ y_w \\ z_w \\ 1 \end{bmatrix}, \qquad \text{[Equation 7]}$$

$$K = \begin{bmatrix} f_x & 0 & u_0 \\ 0 & f_y & v_0 \\ 0 & 0 & 1 \end{bmatrix}$$

s denotes a scale factor of a homogeneous coordinate $\hat{p}$, each of $f_x$, $f_y$ denotes a focal length, and each of $u_0$ and $v_0$ denotes a principal point. Meanwhile, a case of a telecentric model is as follows.

$$\hat{p} = \begin{bmatrix} f_x & 0 & 0 & u_0 \\ 0 & f_y & 0 & v_0 \\ 0 & 0 & 0 & 1 \end{bmatrix}\begin{bmatrix} R & t \\ 0 & 1 \end{bmatrix}\begin{bmatrix} x_w \\ y_w \\ z_w \\ 1 \end{bmatrix}. \qquad \text{[Equation 8]}$$

Here, R and t denote transformation matrices from a checkerboard coordinate system to the camera coordinate system. Here, a relationship between a checkerboard present on one plane and a corresponding pixel may be explained by adding a condition of $z_w$=0.

$$s \cdot \hat{p} = K[R|t]\begin{bmatrix} x_w \\ y_w \\ 0 \\ 1 \end{bmatrix} = K[\,r^1 \quad r^2 \quad t\,]\begin{bmatrix} x_w \\ y_w \\ 1 \end{bmatrix} = H\begin{bmatrix} x_w \\ y_w \\ 1 \end{bmatrix}, \qquad \text{[Equation 9]}$$

-continued $$R=[r^1\ \ r^2\ \ r^3]$$

Likewise, in the case of a telecentric lens camera, it may be expressed as follows.

$$\hat{p}=\begin{bmatrix} f_x & 0 & 0 & u_0 \\ 0 & f_y & 0 & v_0 \\ 0 & 0 & 0 & 1 \end{bmatrix}\begin{bmatrix} R & t \\ 0 & 1 \end{bmatrix}\begin{bmatrix} x_w \\ y_w \\ 0 \\ 1 \end{bmatrix}= \begin{bmatrix} f_x & 0 & 0 & u_0 \\ 0 & f_y & 0 & v_0 \\ 0 & 0 & 0 & 1 \end{bmatrix}\begin{bmatrix} r^1 & r^2 & t \\ 0 & 0 & 1 \end{bmatrix}\begin{bmatrix} x_w \\ y_w \\ 1 \end{bmatrix}=H\begin{bmatrix} x_w \\ y_w \\ 1 \end{bmatrix} \quad \text{[Equation 10]}$$

Here, homography H may acquire a solution in a closed form through coordinates of a predefined checkerboard corner and values of pixel coordinates recognized from an image. The homography includes product of K and extrinsic parameters R and t. However, to inversely compute parameters from H, a plurality of items of homography need to be secured by capturing checkerboard images of various orientations. Theoretically, at least three items of homography are required to compute solutions of all parameters.

Therefore, a camera calibration process generally starts with acquiring images by variously changing an angel of a plane on which a checkerboard pattern is engraved. However, a novel calibration target object is proposed to take advantage of a multi-view system and to perform a projector calibration, which is described below.

Figure 1B:
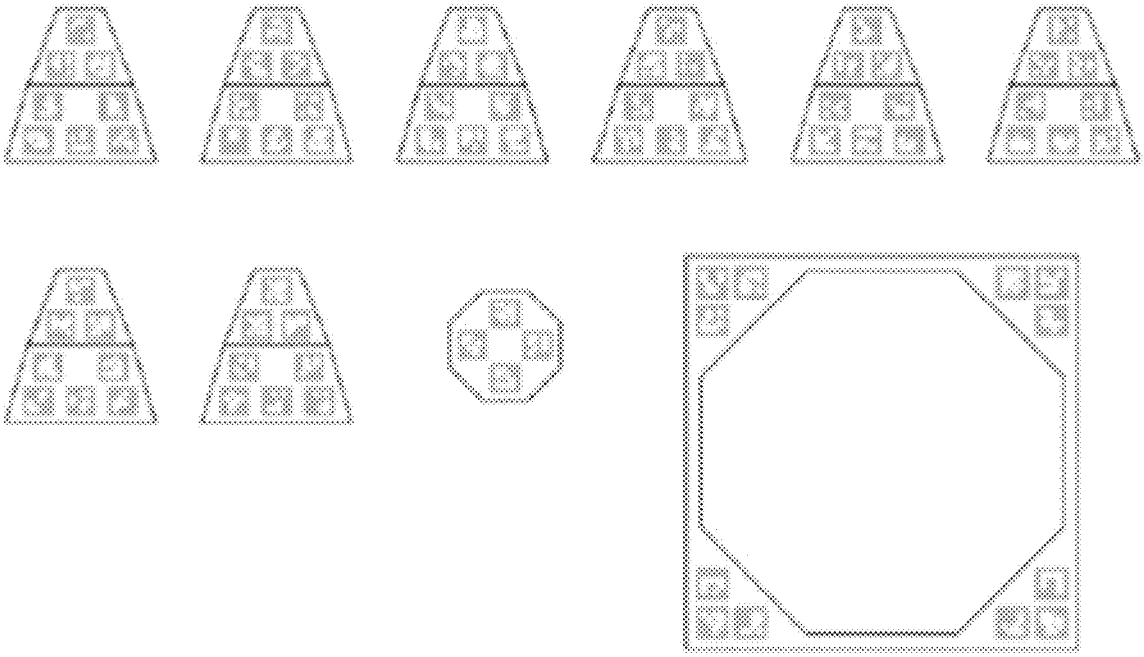

FIG. 1 illustrates a 3D model of a calibration target and a 2D view including Aruco markers according to an example embodiment. In detail, (a) of FIG. 1 illustrates the 3D model of the calibration target according to an example embodiment and (b) of FIG. 1 illustrates the 2D view including Aruco markers according to an example embodiment.

Figure 2A:
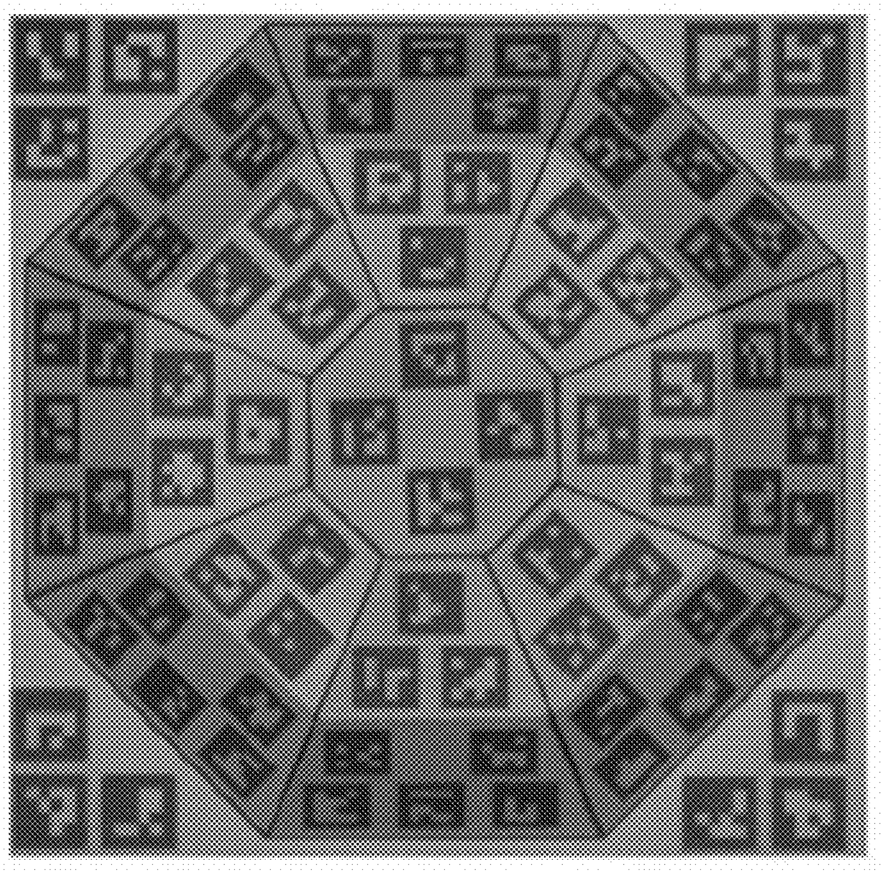
FIGS. 2A and 2B illustrate an actual captured image of a calibration target according to an example embodiment.
Figure 2B:
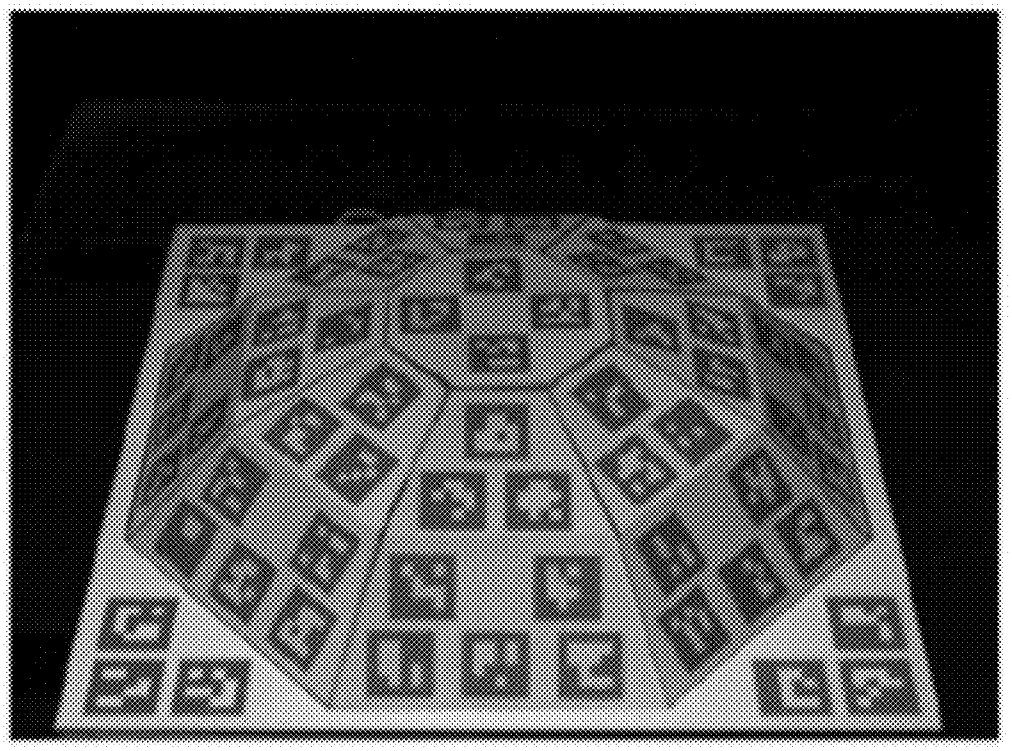

FIG. 2 illustrates an actual captured image of a calibration target according to an example embodiment. In detail, (a) of FIG. 2 illustrates an image captured by a main camera located at the top according to an example embodiment, and (b) of FIG. 2 illustrates an image captured by a side camera 01 (west) according to an example embodiment.

The proposed calibration target is designed to meet the following conditions while performing the example embodiments.

- One camera needs to be able to view as many planes as possible.
- At least two cameras capable of viewing one plane need to be present.
- For more accurate homography computation, at least three Aruco markers need to be arranged on one plane.
- Aruco markers with the same ID are not used several times.

An ID of each Aruco marker of a target does not overlap. Therefore, when a single marker is recognized by a camera, on which plane a corner of the marker is present may be known. Also, each world coordinate system may be defined based on a bottom plane and a coordinate system on a remaining plane may be transformed to a world coordinate system through R and t. For example, if transformation from a local coordinate system to a world coordinate system on an $i^{th}$ plane is $R_{plane,i}$,$t_{plane,i}$, it may be expressed as follows.

$$X_w=R_{plane,i}X_{plane,i}+t_{plane,i}=R_{plane,i}\begin{bmatrix} x_{plane,i} \\ y_{plane,i} \\ 0 \end{bmatrix}+t_{plane,i}= [r^1_{plane,i}\ \ r^2_{plane,i}]\begin{bmatrix} x_{plane,i} \\ y_{plane,i} \end{bmatrix}+t_{plane,i} \quad \text{[Equation 11]}$$

Camera Calibration

Figure 3A:
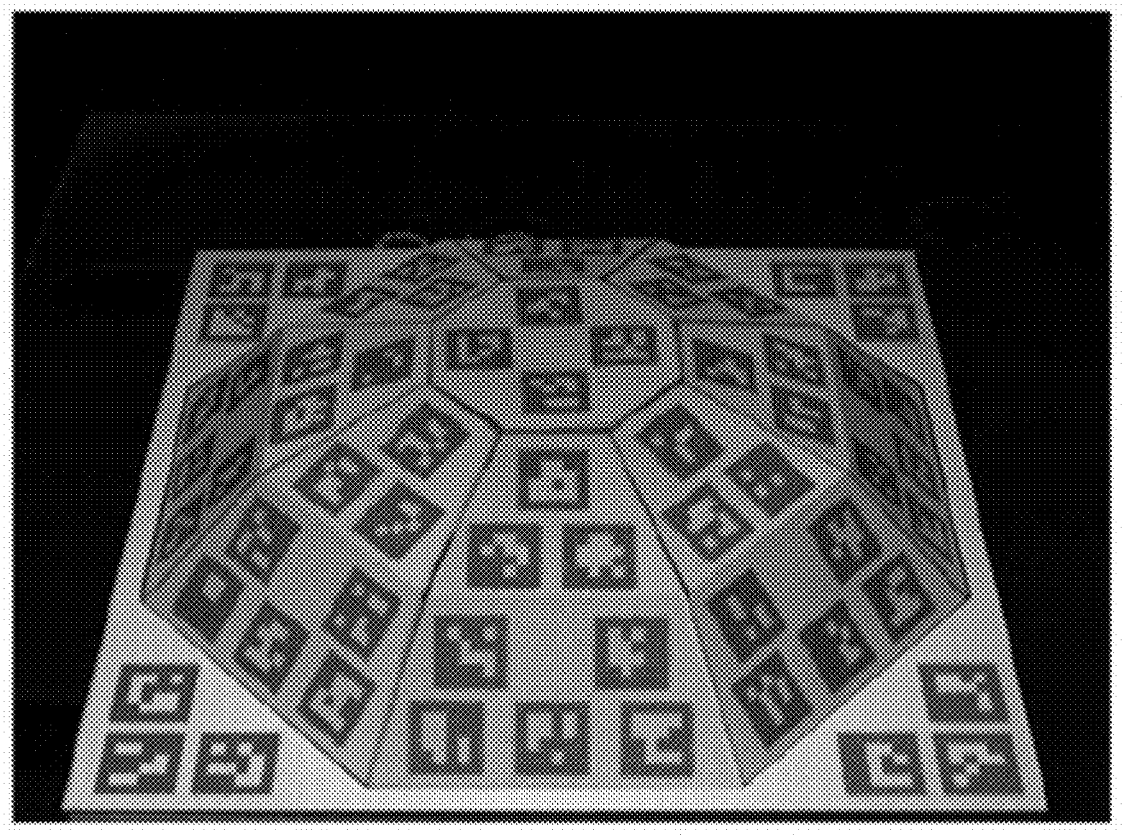
FIGS. 3A and 3B illustrate Aruco marker detection results from an image and reprojection results of a recognized marker using an optimized parameter according to an example embodiment.
Figure 3B:
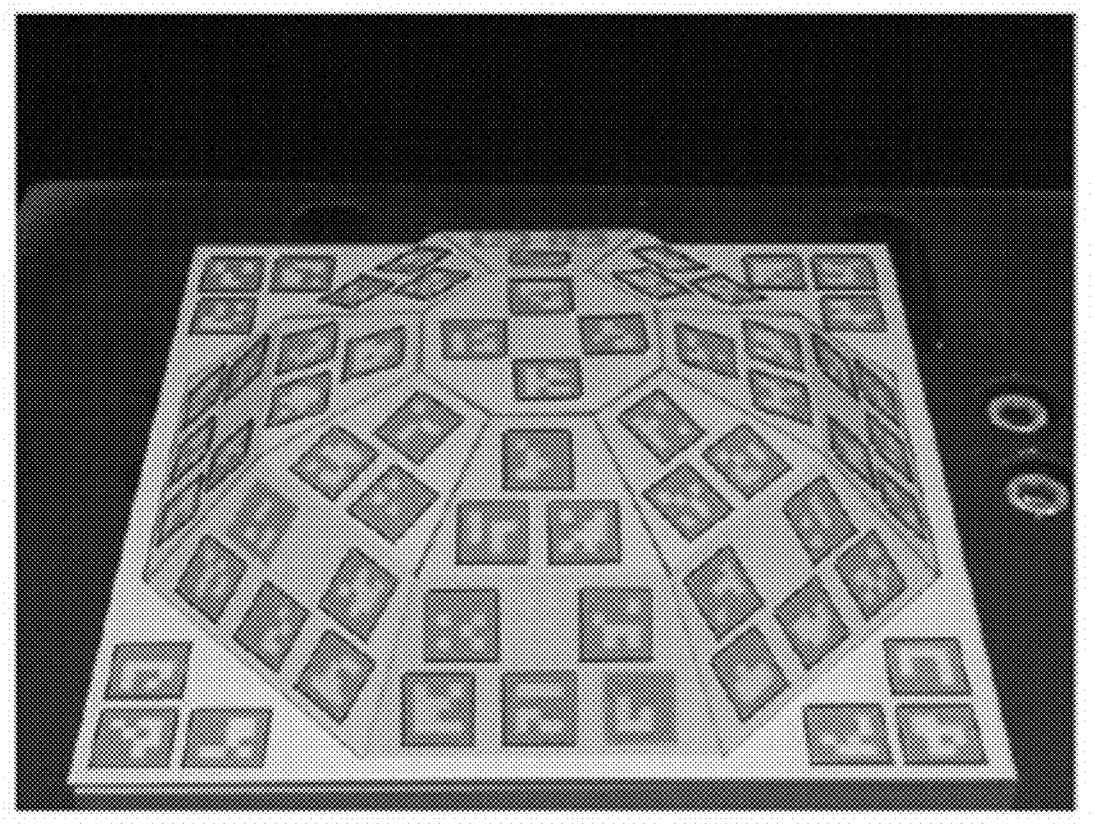

FIG. 3 illustrates Aruco marker detection results from an image and reprojection results of a recognized marker using an optimized parameter according to an example embodiment. In detail, (a) of FIG. 3 illustrates Aruco marker detection results from the image according to an example embodiment, and (b) of FIG. 3 illustrates reprojection results of the recognized marker using the optimized parameter according to an example embodiment. Camera distortion correction is not applied to the image in (a), while the camera distortion correction is applied to the image in (b).

In a typical calibration method of capturing a checkerboard pattern once for each image, one homography is computed for each image and a checkerboard pattern at this time is captured over wide pixels. On the other hand, in a method according to an example embodiment of capturing a plurality of checkerboard planes in one image, a single checkerboard pattern is effectively applied in a narrow area within the image. In the case of an actual camera, a distortion phenomenon by a lens is present and the distortion phenomenon relates to not a linear issue but a nonlinear issue. Therefore, it is difficult to optimize K, R, and t through a plurality of items of homography and it is easy to fall into local minima.

In the case of falling into local minima, it indicates that not only camera parameters but also a coordinate system transformation of each plane in a calibration target may be erroneously optimized. However, in the case of using the aspect that one plane is visible to a plurality of cameras, a camera parameter may be computed without falling into local optima by taking the advantage of a multi-view system.

Initially, since which ID marker is present on each plane is known and local coordinates of each marker corner are predefined, world coordinates of each marker corner may be expressed as a function that uses $R_{plane,i}$,$t_{plane,i}$ as parameters. Then, p predicted through [Equation 1], [Equation 3], [Equation 4], [Equation 5], and [Equation 6] may be expressed as a function that uses world coordinates of the marker corner and an intrinsic parameter and an extrinsic parameter of the camera as parameters and may be compared to actual $p^{gt}$ (undistorted). Accordingly, by optimizing a parameter that simultaneously minimizes a sum of marker corners recognized by all cameras, not only each parameter of all cameras but also $R_{plane,i}$,$t_{plane,i}$ for all planes of the calibration target may also be optimized. Since a total of five cameras capture a target including 18 planes, the system used in the example embodiment may be expressed as follows.

$$\min_{\substack{R_{plane,i},t_{plane,i},R_{cam,j},\\ t_{cam,j}K_{cam,j},(k_1,k_2,k_3)_{cam,j}}} \sum_i\sum_j\sum_p \|p(X_{plane,i})-p^{gt}\|_2^2, \quad \text{[Equation 11]}$$

$$i=0,1,\ldots,17,\ \ j=0,1,2,3,4$$

Phase Decoding and Unwrapping

Figure 4:
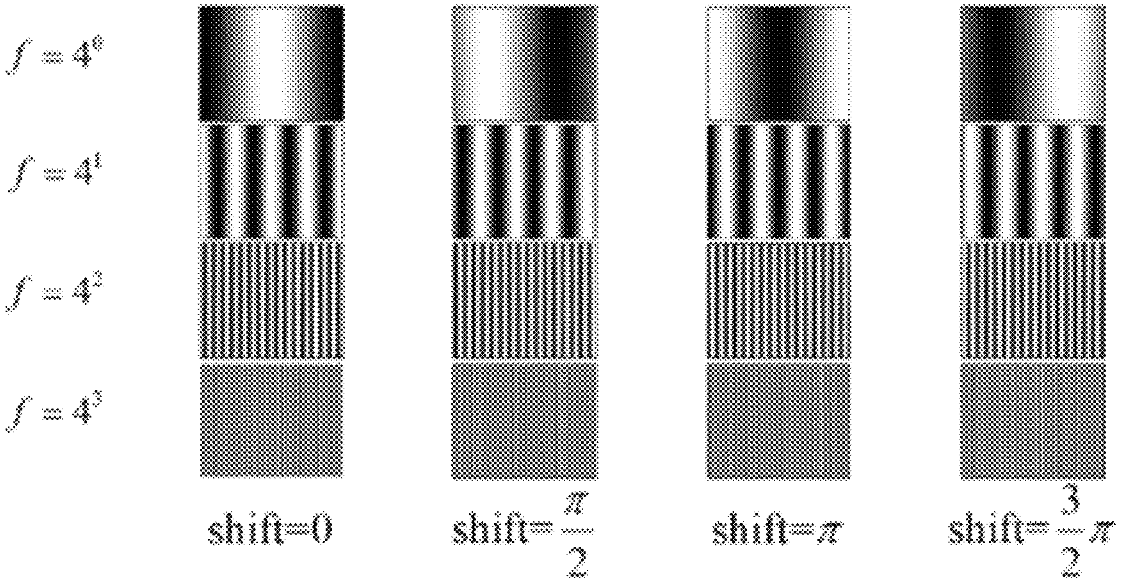
FIG. 4 illustrates an example (vertical axis) of an image to be projected from a projector according to an example embodiment.

FIG. 4 illustrates an example (vertical axis) of an image to be projected from a projector according to an example embodiment. Referring to FIG. 4, four images may be generated for each of frequencies $f=4^0,4^1,4^2,4^3$ and a total of 16 images may be generated and, in the same manner, 16 horizontal axis images may be generated and projected from the projector.

Pixel intensity of an image projected from the projector is in a cosine-wave form of various frequencies in a horizontal axis direction or a vertical axis direction. Frequencies actually used in the example embodiment are $f=4^0,4^1,4^2,4^3$. A total of 4×4=16 images are projected in each of the vertical direction and the horizontal direction by shifting a phase by $$0,\ \frac{\pi}{2},\ \pi,\ \frac{3}{2}\pi$$

for waves generated at a total of four frequencies.

Light projected from the projector is reflected from an object and detected by a camera. When intensity of an $i^{th}$ image projected with the frequency f at a pixel (u, v) is $I_{f,i}(u, v)$, it may be expressed as follows.

$$I_{f,i}(u, v) = A(u, v) + B(u, v)\cos\left[\phi_f(u, v) - \frac{2\pi i}{N}\right],\ N = 4 \qquad \text{[Equation 13]}$$

Here, by combining all pixel intensities at i=0, 1, 2, and 3, phase $\varphi_f(u, v)$ at the pixel (u, v) when the frequency is f may be acquired as follows.

$$\phi_f(u, v) = \arctan\left\{\frac{\sum_{i=0}^{N} I_{f,i}(u, v)\sin\left(\frac{2\pi i}{N}\right)}{\sum_{i=0}^{N} I_{f,i}(u, v)\cos\left(\frac{2\pi i}{N}\right)}\right\}. \qquad \text{[Equation 14]}$$

Figure 5A:
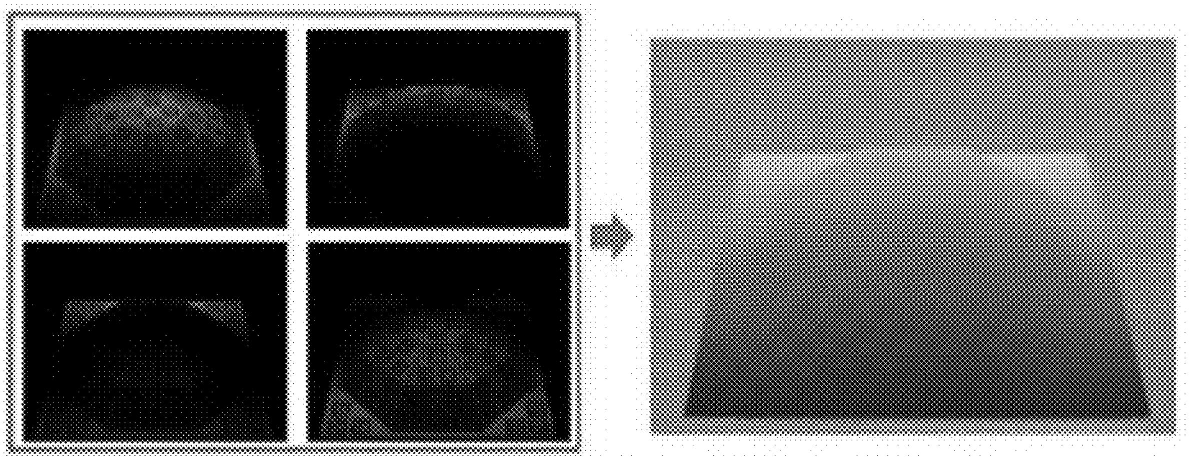
FIGS. 5A and 5B illustrate decoding results of a structured light pattern image captured by a camera according to an example embodiment.
Figure 5B:
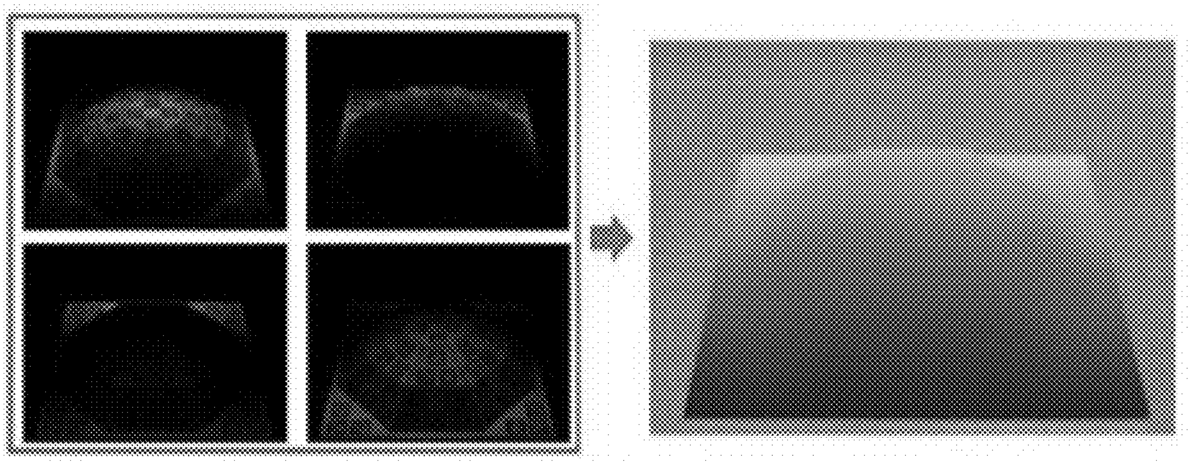

FIG. 5 illustrates decoding results of a structured light pattern image captured by a camera according to an example embodiment. Referring to (a) of FIG. 5, a wrapped phase on the right may be acquired through four images on the left ($f=4^0$). Referring to (b) of FIG. 5, a wrapped phase on the right may be acquired through four images on the left ($f=4^1$).

However, $\phi_f(u, v)$ is a wrapped phase, not an unwrapped phase that is actually used for 3D reconstruction. A wrapped phase at $f=4^0$ includes all areas of an object in a single wavelength, but may not contain detailed information. An unwrapped phase at $f=4^3$ includes locally detailed information, but does not include all areas in a single wavelength.

Therefore, after computing the wrapped phase for all frequencies f, the unwrapped phase $\psi(u, v)$ that encompasses all the wrapped phases from $f=4^0$ to $f=4^3$ needs to be computed.

Figure 6A:
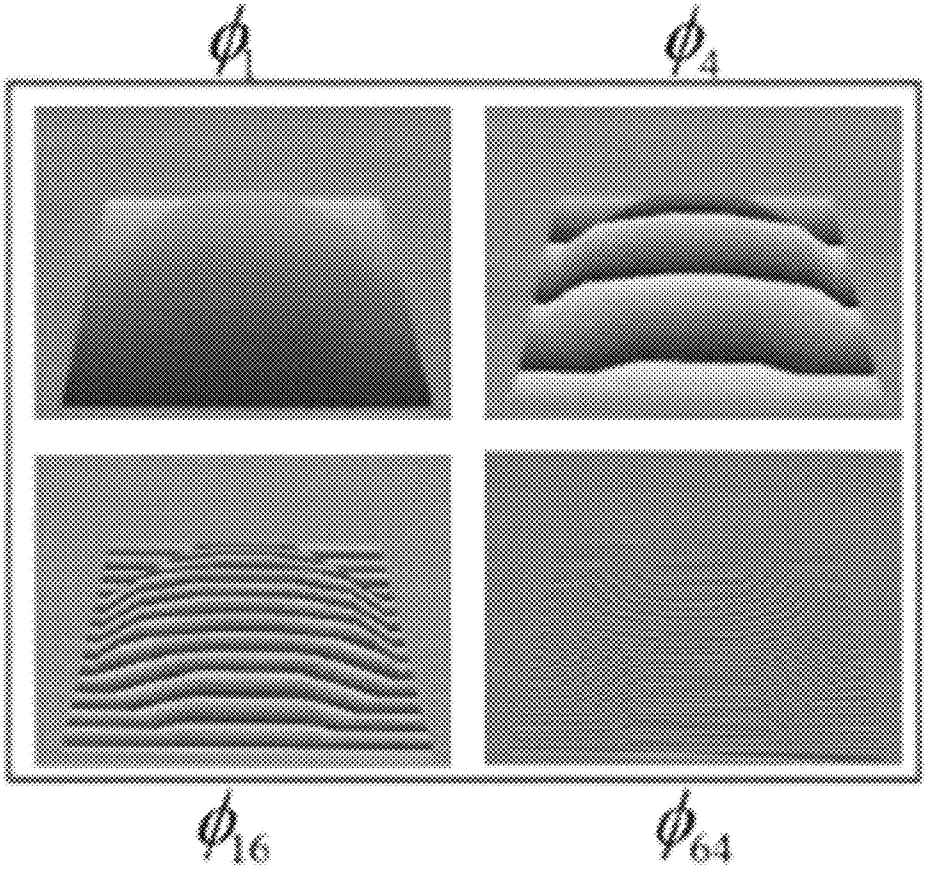
FIGS. 6A and 6B illustrate a phase unwrapping input value and output value according to an example embodiment.
Figure 6B:
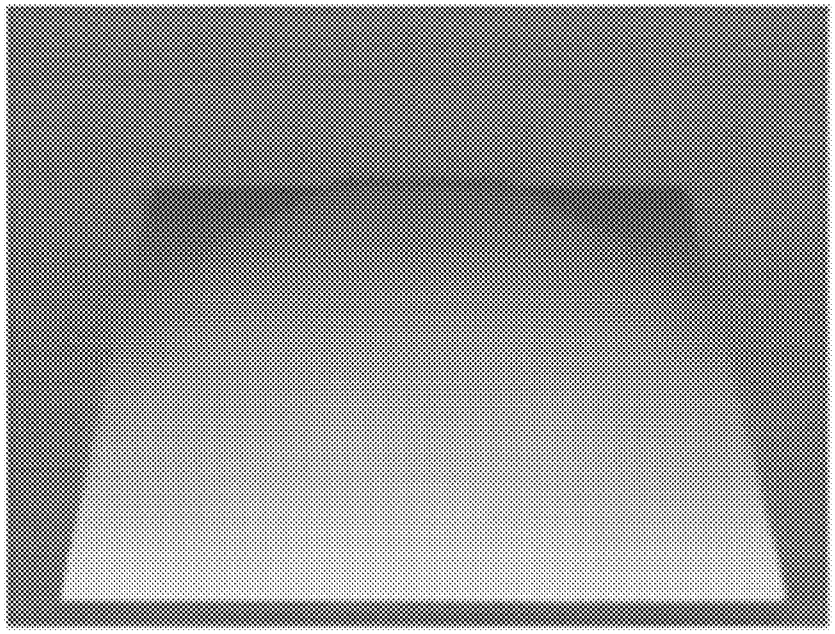

FIG. 6 illustrates a phase unwrapping input value and output value according to an example embodiment.

When $\psi_j$ is an unwrapped phase that encompasses wrapped phases from $f=4^0$ to $f=4^j$, it may be expressed as follows.

$$\psi_0(u, v) = \phi_0(u, v) \qquad \text{[Equation 15]}$$

Also, a process of computing $\psi k_{j+1}(u, v)$ using $\phi_{j+1}(u, v)$ and $\psi_j(u, v)$ is as follows.

$$n_{j+1}(u, v) = \text{round}\left(\frac{4\psi_j - \phi_{j+1}}{2\pi}\right) \qquad \text{[Equation 16]}$$

$$\psi_{j+1}(u, v) = \phi_{j+1} + 2\pi n_{j+1}$$

A finally unwrapped phase $\psi(u, v)=\psi_3(u, v)$ is used as an input value for the 3D reconstruction.

Projector Calibration

Figure 7:
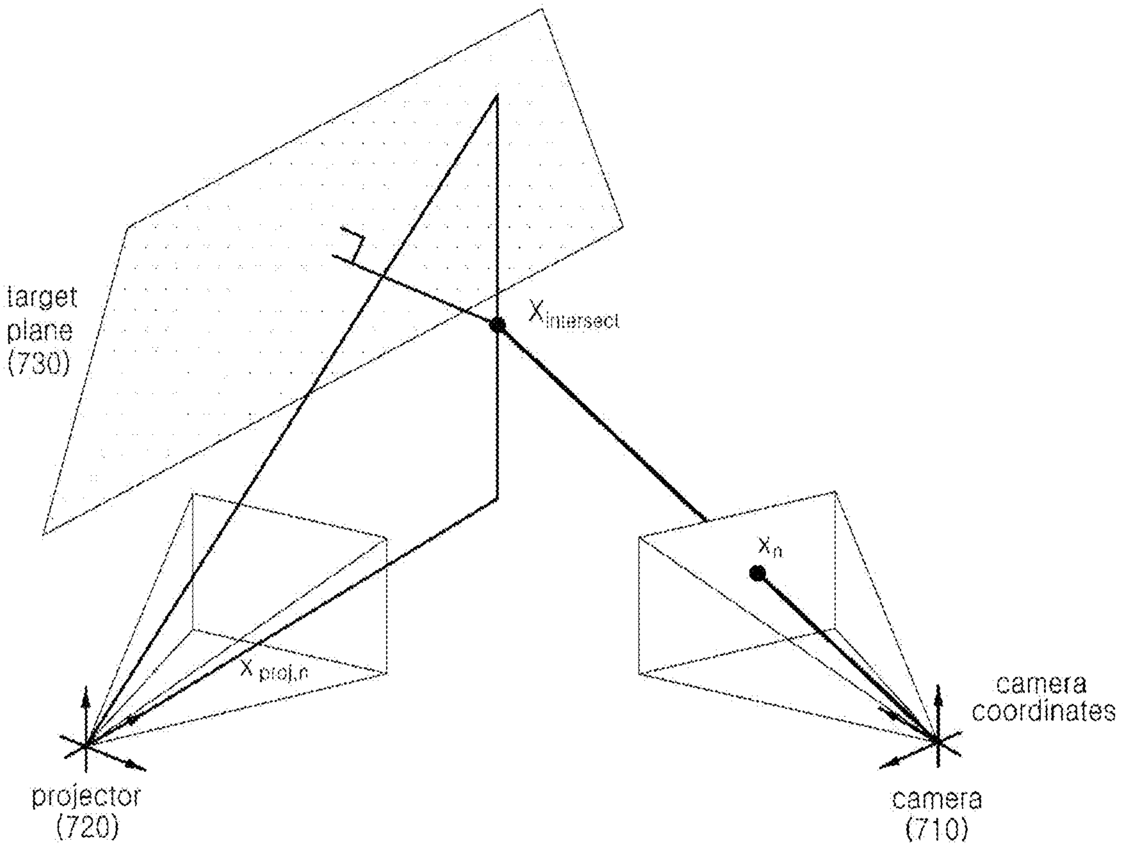
FIG. 7 illustrates acquisition of 3D data through camera pixel coordinates and phase according to an example embodiment.

FIG. 7 illustrates acquisition of 3D data through camera pixel coordinates and phase according to an example embodiment. Referring to FIG. 7, in a calibration stage, loss is constructed and optimized using a distance value between an intersection point $X_{intersect}$ between a camera 710 and a projector 720 and a target plane 730.

In the example embodiment, the projector uses a pinhole camera model, such as a side camera. However, unlike the side camera capable of directly acquiring pixel coordinates, the projector needs to indirectly use an unwrapped phase captured by the camera and thus, a slight change in an intrinsic parameter of the projector is required. Basically, the unwrapped phase has a linear relationship with pixel coordinates $(u, v)_{projector}$ in the pinhole camera model.

$$\psi_x = w_x u + b_x, \qquad \text{[Equation 17]}$$

$$\psi_y = w_y v + b_y.$$

Substituting this into [Equation 6], it may be expressed as follows.

$$\begin{bmatrix}\psi_x\\ \psi_y\\ 1\end{bmatrix} = \begin{bmatrix}w_x & 0 & b_x\\ 0 & w_y & b_y\\ 0 & 0 & 1\end{bmatrix}\begin{bmatrix}f_x & 0 & u_0\\ 0 & f_y & v_0\\ 0 & 0 & 1\end{bmatrix}\hat{x}_{n,p} \qquad \text{[Equation 18]}$$

In [Equation 18], $X_{n,p}$ denotes distorted coordinates present on a normalized projector plane in the projector. Also, assuming that all parameters of a camera and a projector are known in any one camera-and-projector pair, a 3D point acquired by using phase and pixel coordinates as input values needs to meet the following equation.

$$\left\{\begin{array}{l} R_{c11}x_w + R_{c12}y_w + R_{c13}z_w + t_{c1} = x_n(R_{c31}x_w + R_{c32}y_w + R_{c33}z_w + t_{c3}) \\ R_{c12}x_w + R_{c22}y_w + R_{c23}z_w + t_{c2} = y_n(R_{c31}x_w + R_{c32}y_w + R_{c33}z_w + t_{c3}) \\ R_{p11}x_w + R_{p12}y_w + R_{p13}z_w + t_{p1} = x_{n,p}(R_{p31}x_w + R_{p32}y_w + R_{p33}z_w + t_{p3}) \end{array}\right\} \qquad \text{[Equation 19]}$$

(a) of FIG. 6 illustrates the phase unwrapping input value according to an example embodiment and (b) of FIG. 6 illustrates the phase unwrapping output value according to an example embodiment. A final unwrapped phase may be computed by integrating all the wrapped phases that are $f=4^0, 4^1, 4^2, 4^3$.

When geometrically analyzed, first two equations of [Equation 19] represent a straight line that passes through a point $[x_n, y_n, 1]$ present on the normalized camera plane and a camera origin, and the last equation represents a plane that includes a projector origin and a straight line $x=x_{n,p}$ (or $y=y_{n,p}$) on a normalized projector plane. A point $p_{intersect}=$ $[x_w, y_w, z_w]$ reconstructed in the 3D space may be an intersection point of the straight line and the plane.

Arranging [Equation 19], $p_{intersect}$ ($X_{intersect}$ in FIG. 7) may be expressed as a function for a projector parameter.

[Equation 20]

$$P_{intersect} = \begin{bmatrix} R_{c11} - x_n R_{c31} & R_{c12} - x_n R_{c32} & R_{c13} - x_n R_{c33} \\ R_{c21} - y_n R_{c31} & R_{c22} - y_n R_{c32} & R_{c23} - y_n R_{c33} \\ R_{p11} - x_{proj,n} R_{p31} & R_{p12} - x_{proj,n} R_{p32} & R_{p13} - x_{proj,n} R_{p33} \end{bmatrix}^{-1} \begin{bmatrix} x_n t_{c3} - t_{c1} \\ y_n t_{c3} - t_{c2} \\ x_{proj,n} t_{p3} - t_{p1} \end{bmatrix}$$

Also, since an Aruco marker ID of a calibration target is unique, an area on an image on which plane is located may be extracted from the camera. A phase $(\psi_x, \psi_y)$ corresponding to a pixel (u, v) within an area in which a plane i is captured may be transformed to $\overline{x}_c$, $\overline{y}_c$, $\overline{x}_p$ (or $\overline{y}_p$) through [Equation 5], [Equation 6], and [Equation 18]. Through this, $p_{intersect}$ may be computed and since $p_{intersect}$ is present on the plane i, equation of the plane i needs to be satisfied.

[Equation 21]

$$n_i p_{intersect} + c_i = 0,$$

$$n_i = R_{plane,i} \begin{bmatrix} 0 \\ 0 \\ 1 \end{bmatrix},$$

$$c_i = -n_i \cdot t_{plane,i}$$

Therefore, an optimal parameter of the projector may be acquired through an optimization process of using $(n_i p_{intersect} + c_i)^2$ as a loss and using an intrinsic parameter and an extrinsic parameter of the projector as parameters.

[Equation 22]

$$\text{minimize}_{R,t} \sum_i \sum_{u,v} \{n_i p_{intersect}(u, v, \psi(u, v); R, t) + c_i\}^2$$

Here, $n_i$ denotes an i-plane normal vector.

3D Reconstruction

A point cloud may be acquired through [Equation 20] using parameters of the camera and the projector optimized through the above process. Also, through [Equation 1], transformation from world coordinates to camera coordinates may be performed for all points in the point cloud and a depth map may be acquired for each camera-and-projector pair by storing a z value of the camera coordinates. However, due to a measurement error in the camera, an error may occur in the depth map. Therefore, pixel-wise confidences of all depth maps need to be computed and a process of integrating the point cloud based on the same needs to be performed.

To acquire a depth map pixel-wise confidence of a corresponding camera by using an arbitrary camera as a reference, depth $d_{ref}(u, v)$ corresponding to each pixel (u, v) may be acquired and world coordinates of a corresponding point in the 3D space may be acquired and world coordinates of the corresponding point in the 3D space may be acquired. Also, a remaining camera excluding a reference camera may transform world coordinates of a corresponding point p(u, v) to each camera coordinate through [Equation 1]. Here, a camera j(j≠ref) acquires values of pixel coordinates $u_j$ and $v_j$ corresponding to p(u, v) and then performs a visibility test using a depth map of the camera j.

Visibility $v_j(p(u, v))$ is 1 when the camera j compares an actual depth $z_j$ of p(u, v) to $d_j(u_j, v_j)$ acquired through the depth map of the camera j and, as a result, $d_j(u_j, v_j)$ is larger, and is zero when $d_j(u_j, v_j)$ is smaller, and thereby p is determined to not be visible from the camera j. For every camera j with $v_j(p)=1$, confidence $C_{ref,j}(u, v)$ may be computed as follows.

[Equation 23]

$$C_{ref,j}(u, v) = \exp\{-(z_j - d_j(u_j, v_j))^2\}$$

Figure 8A:
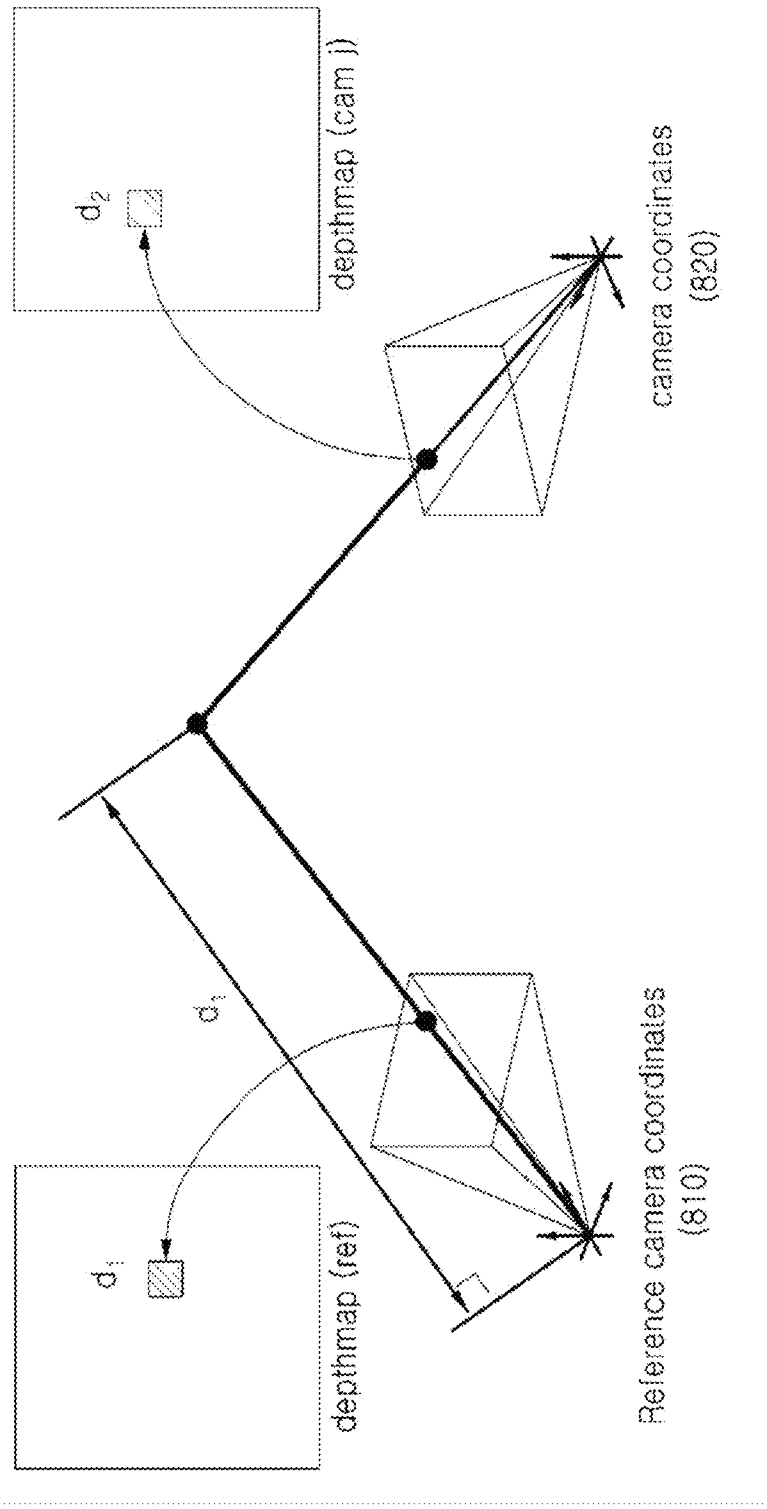
FIGS. 8A and 8B illustrate a confidence computation process of a depth map according to an example embodiment.
Figure 8B:
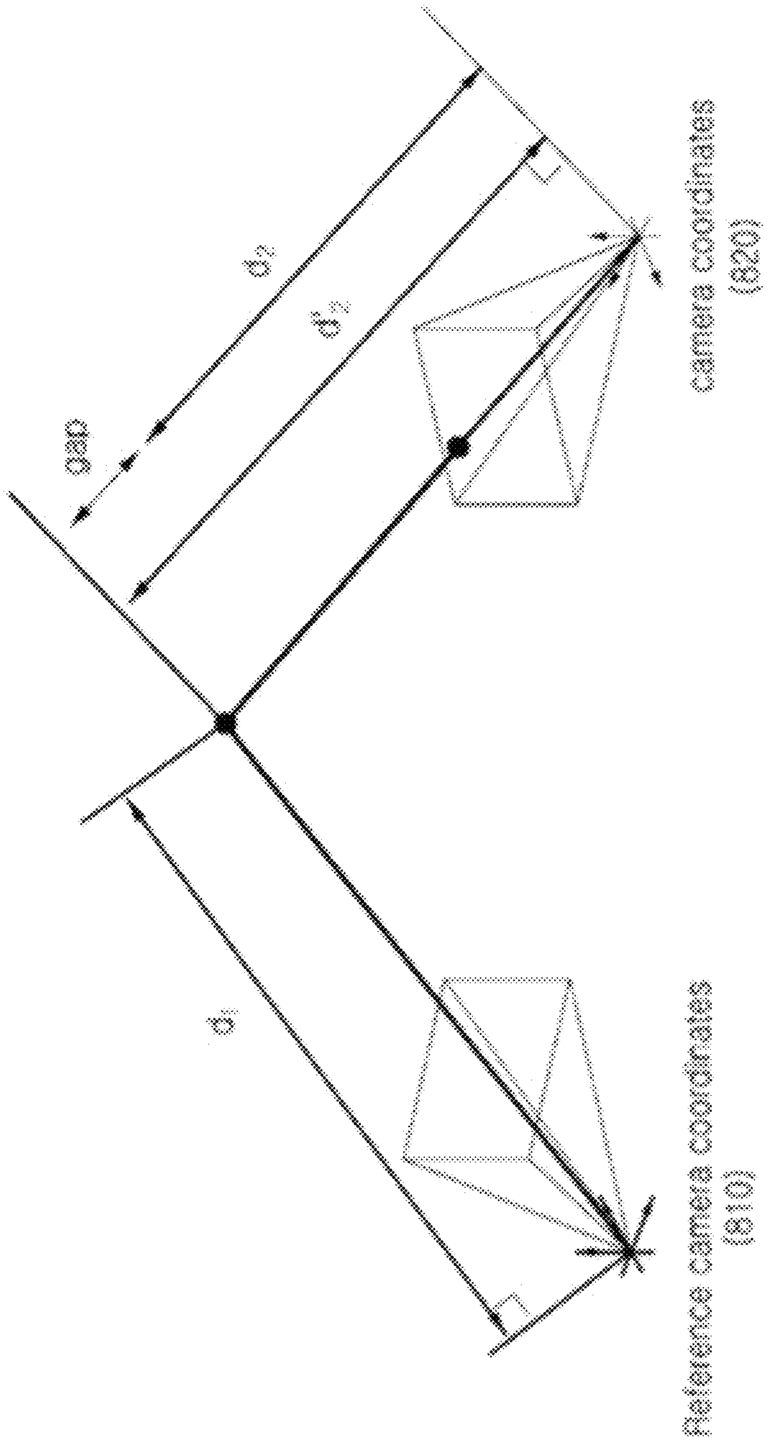

FIG. 8 illustrates a confidence computation process of a depth map according to an example embodiment. Referring to (a) and (b) of FIG. 8, the closer an actual depth $d'_2$ between a 3D point generated from a depth map of a reference camera and another camera j to a depth map value of the camera j, the higher the confidence. Here, 810 represents reference camera coordinates and 820 represents camera coordinates.

Confidence $C_{ref}(u, v)$ of a pixel (u, v) of the reference camera may be represented as follows for every camera j with $v_j(p(u, v))=1$.

[Equation 24]

$$C_{ref}(u, v) = \prod_j C_{ref,j}(u, v)$$

By going through a process of computing confidences for all depth maps and then integrating the same into one through the aforementioned process, the 3D reconstruction is finally completed. For arbitrary camera j, a depth and a confidence are given for each pixel of a depth map. Here, there may be a case in which a 3D point $p_j$ acquired through the depth map is visible to the main camera and a case in which it is not visible. When it is visible to the main camera, depth and confidence (d, C) of $p_j$ may be stored by the camera in an array $L_{main}(u, v)$ for a pixel (u, v) corresponding to $p_j$. When this process is performed for depth maps of all cameras, a 3D point array may be given for each pixel (u, v) of the main camera. Accordingly, the depth map of the main camera is computed in a form of a weighted sum as follows.

[Equation 25]

$$D_{main} = (u, v) = \frac{\sum_{(d,C)\in L_{main}(u,v)} C \times d}{\sum_{(d,C)\in L_{main}(u,v)} C}$$

When $p_j$ is not visible to the main camera, the side camera performs the aforementioned process and a confidence-based depth map fusion is finally completed.

Figure 9:
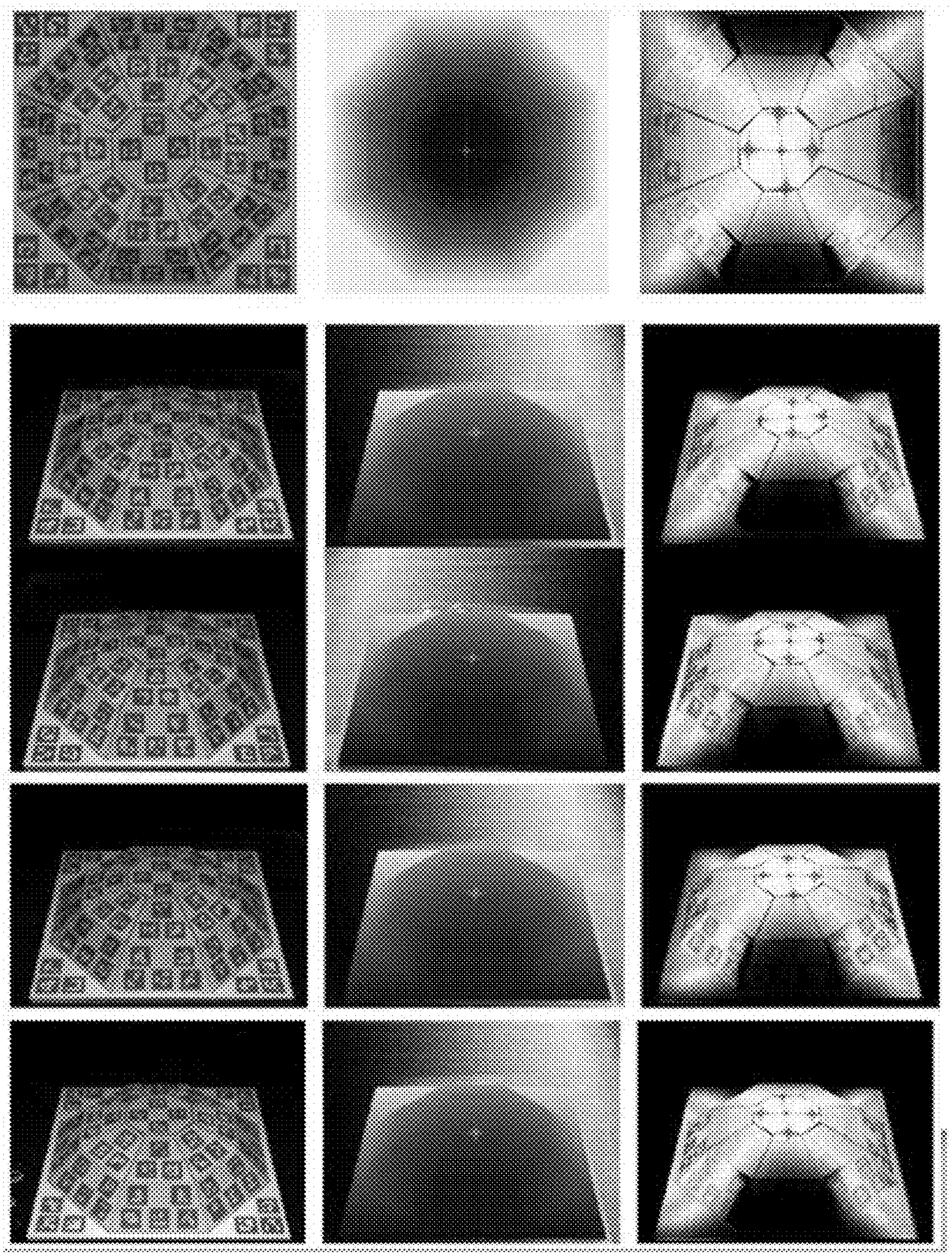
FIG. 9 illustrates a target image, a depth map, and confidence map according to an example embodiment.

FIG. 9 illustrates a target image, a depth map, and a confidence map according to an example embodiment.

Referring to FIG. 9, a view on the left represents a captured target image, a view in the middle represents a depth image from a corresponding camera, and a view on the right represents a confidence map. Starting from a first row, a main camera, aside camera 00 (east), aside camera 01 (west), a side camera 02 (south), and a side camera 03 (north) are shown.

It can be seen that depth and confidence variously appear due to a plurality of variables, including view vectors of the projector and the camera and an angle of reflected light.

Figure 10:
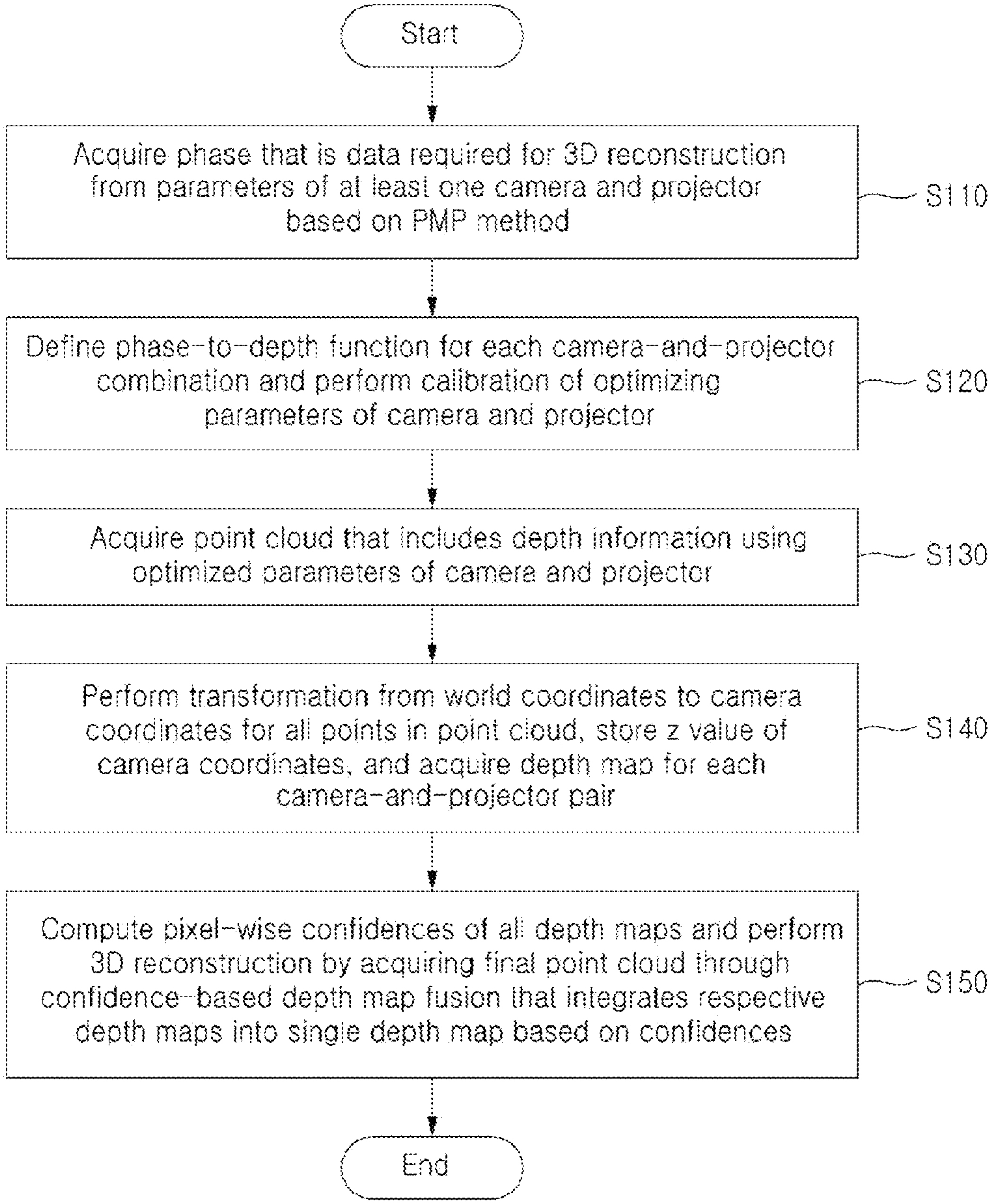
FIG. 10 is a flowchart illustrating a 3D calibration method for multi-view phase shift profilometry according to an example embodiment.

FIG. 10 is a flowchart illustrating a 3D calibration method for multi-view phase shift profilometry according to an example embodiment.

Referring to FIG. 10, the 3D calibration method for multi-view phase shift profilometry performed by a computer device according to an example embodiment may include operation S110 of acquiring a phase that is data required for 3D reconstruction from parameters of at least one camera and a projector based on a PMP method, operation S120 of defining a phase-to-depth function for each camera-and-projector combination and performing calibration of optimizing the parameters of the camera and the projector, and operation S130 of acquiring a point cloud that includes depth information using the optimized parameters of the camera and the projector.

Also, the 3D calibration method for multi-view phase shift profilometry may further include operation S140 of performing transformation from world coordinates to camera coordinates for all points in the point cloud, storing a z value of the camera coordinates, and acquiring a depth map for each camera-and-projector pair, and operation S150 of computing pixel-wise confidences of all the depth maps and performing the 3D reconstruction by acquiring a final point cloud through a confidence-based depth map fusion that integrates the respective depth maps into a single depth map based on the confidences.

According to example embodiments, camera calibration may be performed without moving a single target and calibration of a camera and a projector may be simultaneously performed with a single target. Also, a phase-to-depth function through an inverse camera model of the projector may be defined.

Hereinafter, the 3D calibration method for multi-view phase shift profilometry according to an example embodiment is further described.

The 3D calibration method for multi-view phase shift profilometry according to an example embodiment will be described using a 3D calibration apparatus for multi-view phase shift profilometry as an example.

Figure 11:
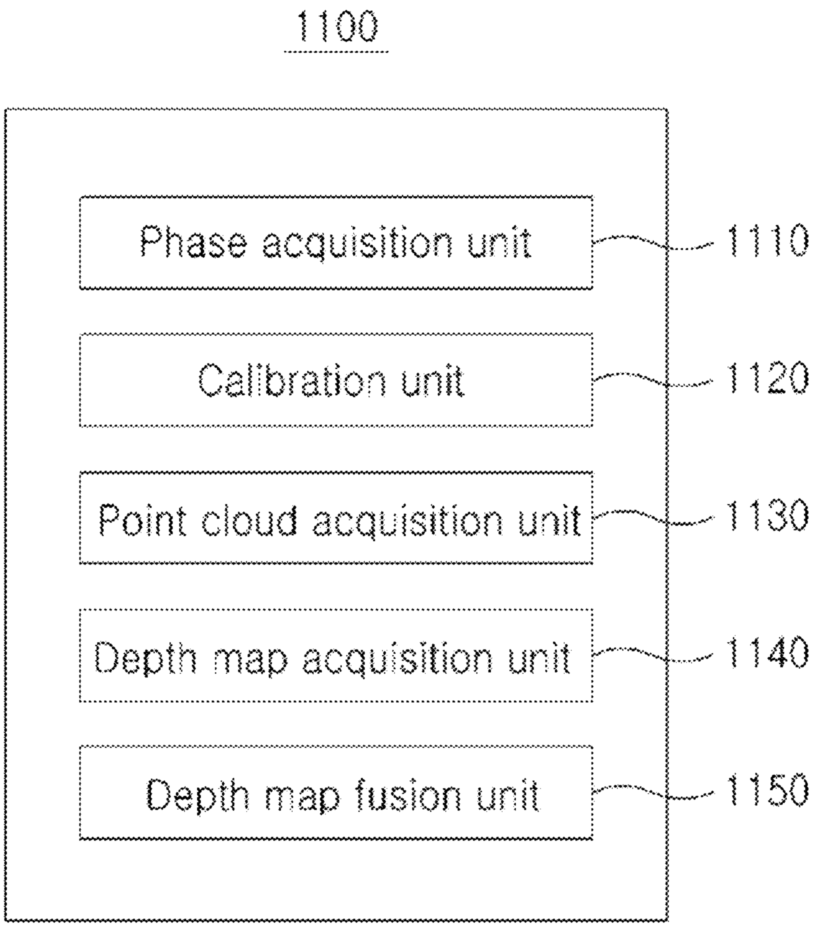
FIG. 11 is a block diagram illustrating a 3D calibration apparatus for multi-view phase shift profilometry according to an example embodiment.

FIG. 11 is a block diagram illustrating a 3D calibration apparatus for multi-view phase shift profilometry according to an example embodiment.

Referring to FIG. 11, a 3D calibration apparatus 1100 for multi-view phase shift profilometry according to an example embodiment may include a phase acquisition unit 1110, a calibration unit 1120, and a point cloud acquisition unit 1130. Also, depending on example embodiments, the 3D calibration apparatus 1100 for multi-view phase shift profilometry may further include a depth map acquisition unit 1140 and a depth map fusion unit 1150.

In operation S110, the phase acquisition unit 1110 may acquire a phase that is data required for 3D reconstruction from parameters of at least one camera and a projector based on a PMP method.

In detail, the phase acquisition unit 1110 may acquire the phase required for the 3D reconstruction from a single camera-and-projector pair in such a manner that the projector projects a series of structured light images and projected light is reflected from an object and detected at a sensor of the at least one camera. Here, the phase acquisition unit 1110 may configure a main camera located at the top and a side camera located on at least one side surface, and may acquire the phase based on the PMP method using the projector present between the main camera and the side camera.

In operation S120, the calibration unit 1120 may define a phase-to-depth function for each camera-and-projector combination and may perform calibration of optimizing the parameters of the camera and the projector. Here, the phase-to-depth function relates to transforming the phase to a depth or a depth map.

That is, the calibration unit 1120 may perform a calibration of forming a phase-to-depth map with a camera parameter using a fixed target. In the prior art, calibration may be performed by performing shooting while physically turning a flat target several times. In the case of using this dynamically moving object, the phase-to-depth map of the PMP method may not be calibrated. The example embodiments may simultaneously acquire camera parameters through phase-to-depth map calibration of the PMP method by intentionally making a target static and by using the same to project images of various phases onto the target.

In operation S130, the point cloud acquisition unit 1130 may acquire a point cloud that includes depth information using optimized parameters of the camera and the projector.

In operation S140, the depth map acquisition unit 1140 may perform transformation from world coordinates to camera coordinates for all points in the point cloud, may store a z value of the camera coordinates, and may acquire a depth map for each camera-and-projector pair.

In operation S150, the depth map fusion unit 1150 may compute pixel-wise confidences of all the depth maps and may perform the 3D reconstruction by acquiring a final point cloud through a confidence-based depth map fusion that integrates the respective depth maps into a single depth map based on the confidences.

Figure 12:
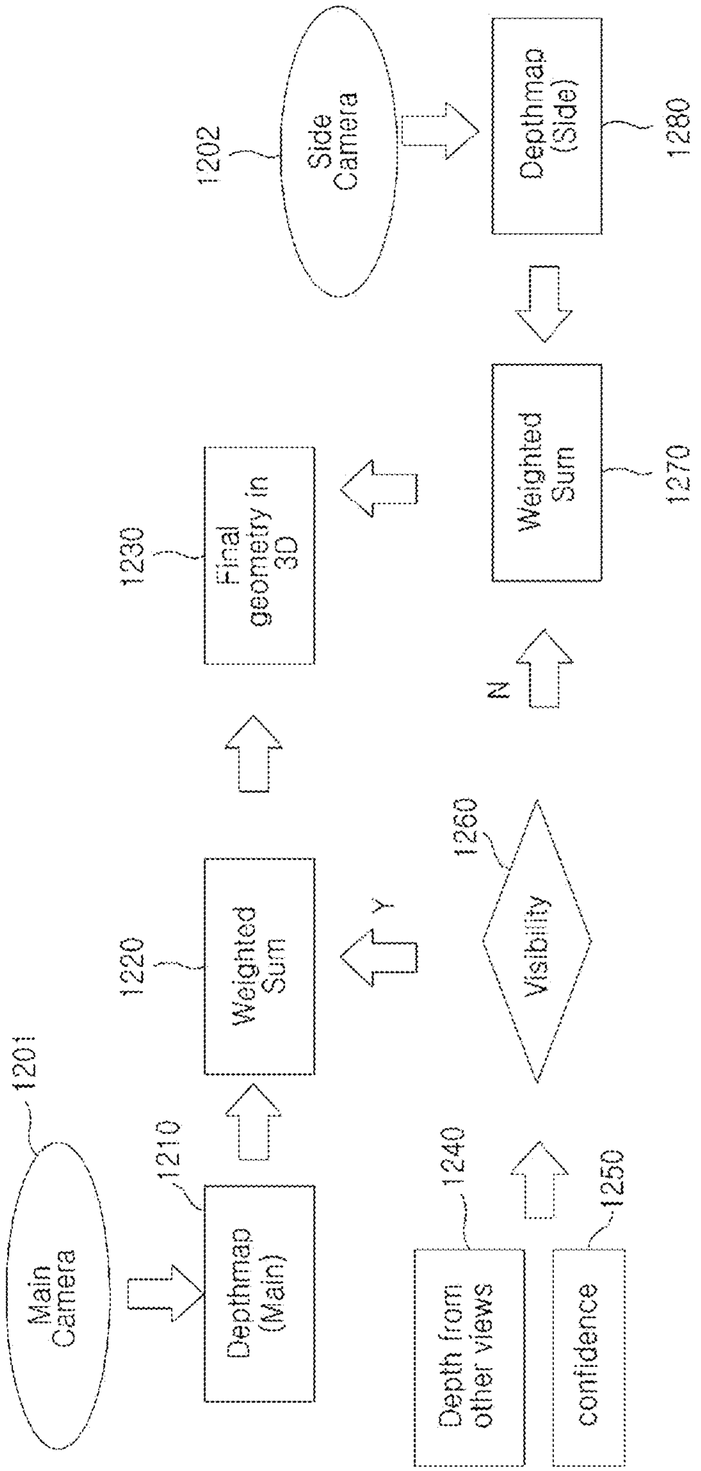
FIG. 12 is a diagram for explaining a depth map fusion according to an example embodiment.

FIG. 12 is a diagram for explaining a depth map fusion according to an example embodiment.

Referring to FIG. 12, the depth map fusion unit 1150 may divide points in a 3D space that may be acquired through a depth 1240 of each pixel when computing a confidence 1250 for each pixel of a depth map into two cases: a case in which a point is visible to a main camera 1201 at the top and a case in which a point is not visible. That is, it may be classified depending on presence or absence of visibility 1260 through the main camera 1201.

For points visible to the main camera 1201, a depth map fusion may be performed through a weighted sum 1220 with a depth map 1210 of the main camera along with the corresponding confidence 1250. For points not visible to the main camera 1201, the depth map fusion may be performed through a weighted sum 1270 in a depth map 1280 of a side camera 1202. Through this, a final 3D point cloud 1230 may be acquired.

Figure 13A:
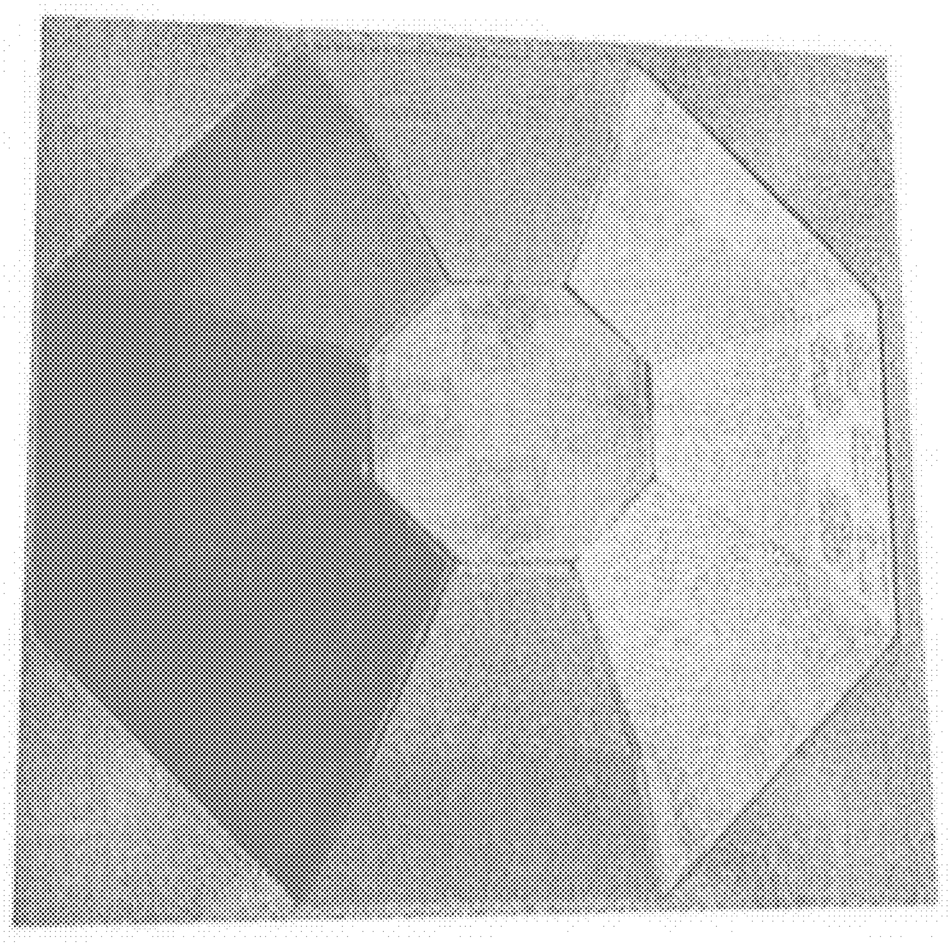
FIGS. 13A and 13B illustrate a final 3D point cloud according to an example embodiment.
Figure 13B:
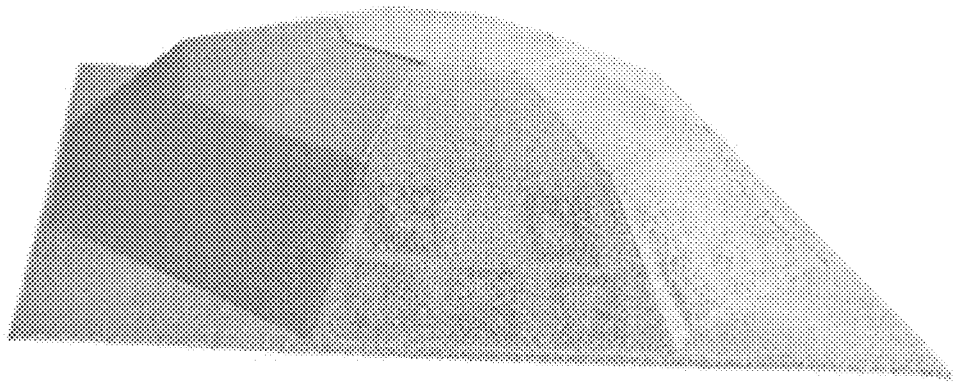

FIGS. 13A and 13B illustrate a final 3D point cloud according to an example embodiment.

FIGS. 13A and 13B illustrate the final 3D point cloud acquired by performing shooting for a calibration target and then completing a depth map fusion through addition of a depth map of a side camera to a depth map of a main camera.

As a result, calibration of a PMP system for 3D reconstruction is successfully performed with only one target through the example embodiment and it can be seen that the calibration and the 3D reconstruction may be performed with only one scene without performing additional shooting while moving a corresponding target. Also, the phase-to-depth function may be configured using only parameters of the camera and projector without additional parameters.

The aforementioned apparatuses may be implemented through hardware components, software components, and/or combination of the hardware components and the software components. For example, the apparatuses and the components described in the example embodiments may be implemented using one or more general-purpose or special purpose computers, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A three-dimensional (3D) calibration method for multi-view phase shift profilometry, performed by a computer device, the 3D calibration method comprising:

acquiring a phase, which is data required for 3D reconstruction, from parameters of at least one camera and a projector based on a phase measuring profilometry (PMP) method;

for each combination of the camera and the projector, defining a phase-to-depth function and performing calibration for optimizing parameters of the camera and the projector; and obtaining a point cloud including depth information by using the optimized parameters of the camera and the projector, wherein the method further comprises:

transforming, for all points of the point cloud, world coordinates into camera coordinates, and storing a z value of the camera coordinates to obtain a depth map for each pair of the camera and the projector; and calculating a pixel-wise confidence of each depth map in order to correct an error of the depth maps, and performing 3D reconstruction by obtaining a final point cloud through confidence-based depth map fusion that integrates the depth maps into one based on the confidence, wherein the performing of the 3D reconstruction by obtaining the final point cloud comprises:

for points in a 3D space obtained from a depth of each pixel when calculating the pixel-wise confidence of the depth maps, performing depth map fusion through a weighted sum with a depth map of a main camera together with a corresponding confidence for points visible to the main camera; and performing depth map fusion through a weighted sum with a depth map of at least one side camera for points not visible to the main camera, and wherein the performing of the calibration comprises simultaneously optimizing the parameters of the camera and the projector from a single scene using a single static target including a plurality of planes on which aruco markers are arranged.

2. The 3D calibration method of claim 1, wherein the acquiring of the phase comprises:

projecting a series of structured light images using the projector;

detecting projected light that is reflected from an object using a sensor of the at least one camera; and acquiring the phase required for the 3D reconstruction using a single camera-and-projector pair.

3. The 3D calibration method of claim 1, wherein the acquiring of the phase comprises:

projecting a series of structured light images using the projector;

detecting projected light reflected from an object to be measured by using a main camera disposed above the object to be measured and at least one side camera disposed laterally with respect to the object to be measured; and acquiring the phase required for the 3D reconstruction from at least one camera-and-projector pair.

4. A three-dimensional (3D) calibration apparatus for multi-view phase shift profilometry, comprising:

at least one processor; and memory storing instructions that, when executed by the at least one processor, cause the apparatus to:

acquire a phase, which is data required for 3D reconstruction, from parameters of at least one camera and a projector based on a phase measuring profilometry (PMP) method;

for each combination of the camera and the projector, define a phase-to-depth function and perform calibration for optimizing parameters of the camera and the projector;

obtain a point cloud including depth information by using the optimized parameters of the camera and the projector;

transform, for all points of the point cloud, world coordinates into camera coordinates, and store a z value of the camera coordinates to obtain a depth map for each pair of the camera and the projector; and calculate a pixel-wise confidence of each depth map in order to correct an error of the depth maps, and perform 3D reconstruction by obtaining a final point cloud through confidence-based depth map fusion that integrates the depth maps into one based on the confidence, wherein, in performing the 3D reconstruction, the at least one processor is further configured to:

perform depth map fusion through a weighted sum with a depth map of a main camera together with a corresponding confidence for points visible to the main camera; and perform depth map fusion through a weighted sum with a depth map of at least one side camera for points not visible to the main camera, and wherein, in performing the calibration, the at least one processor is configured to simultaneously optimize the parameters of the camera and the projector from a single scene using a single static target including a plurality of planes on which aruco markers are arranged.

5. The 3D calibration apparatus of claim 4, wherein the at least one processor is configured to acquire the phase required for the 3D reconstruction by using a single camera-and-projector pair in such a manner that the projector projects a series of structured light images and projected light is reflected from an object and detected at a sensor of the at least one camera.

6. The 3D calibration apparatus of claim 4, wherein the at least one processor is configured to acquire the phase by using a main camera disposed above an object to be measured and at least one side camera disposed laterally with respect to the object to be measured.

* * * * *